United States Patent Office 2,995,486
Patented Aug. 8, 1961

2,995,486
METHOD FOR COMBATING PESTS AND PREPARATIONS SUITABLE THEREFOR
Richard Sallmann, Binningen, Switzerland, assignor to Ciba Limited, Basel, Switzerland
No Drawing. Filed Jan. 30, 1956, Ser. No. 561,977
Claims priority, application Switzerland, Sept. 25, 1951
9 Claims. (Cl. 167—22)

The present application is a continuation-in-part of my copending application Serial No. 310,533, filed September 19, 1952 (and abandoned since the filing of the present application) and is concerned with a method for combating pests and preparations suitable therefor.

According to the present invention objects can be protected against pests, e.g. insects like flies, mosquitoes, aphids or spider mites by treating the objects with an effective amount of a condensation product from 1 mol of a trialkylphosphite the alkyl groups of which contain 1 to 4 carbon atoms and 1 mol of a trichloracetic acid alkyl ester, the alkyl group of which contains at most 6 carbon atoms and contains only carbon and hydrogen atoms.

As starting materials suitable for the preparation of the condensation products of the present invention there may be mentioned for example trimethylphosphite, triethylphosphite, tripropyl phosphite, tri-(2-chlorethyl)- phosphite; the ethyl-, isopropyl-, butyl-hexylesters of trichloracetic acid.

The compounds used in the invention are obtained by reacting together the aforesaid components in molecular proportions. They lead to unitary products, and only one halogen atom enters into reaction, notwithstanding the possibility that two or three molecular proportions of the phosphorus compound could react with one molecular proportion of the carbonyl compound. Since the reaction is frequently exothermic, it may be necessary to react the components while cooling and to dilute them with inert solvents, such as benzene, toluene, ether, dioxane, hexane or low boiling benzine. The reaction is advantageously brought to an end by heating up to about 50–120° C. By suitably choosing the reaction components the condensation products can be distilled under reduced pressure.

The constitution of the condensation products cannot be given with absolute certainty, but the most probable formula is

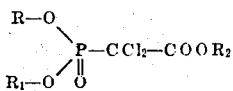

wherein R and $R_1$ each is an aliphatic radical containing 1 to 4 carbon atoms and $R_2$ is an alkyl radical containing at the most 6 carbon atoms and only carbon and hydrogen atoms. Instead of the indicated phosphonic acid structure the possibility must be considered that the structure is that of an isomeric phosphoric acid ester.

The compounds of the invention are active against the various stages of development of the pests, such as eggs, larvae and imagines, so that they can be used as contact, stomach or respiratory poisons.

They are capable of protecting a very wide variety of materials against pests, and gaseous or liquid or solid materials can be used as carriers for the active substances. As materials to be protected or used as carriers there come into consideration, for example, air, especially in rooms, and liquids such, for example, as water in ponds, and finally any inanimate or living solid substratum such, for example, as any objects in living rooms, cellars, plaster floors, stables and also pelts, feathers, wool and the like, and also living organisms of the vegetable and animal kingdoms in their various stages of development, insofar as they are insensitive to the pest-combating agents.

The combating of pests may be carried out by the usual methods, for example, by treatment of the material to be protected with the compounds in vapor form, for example, as fumigating agents or in the form of dusts or spraying liquors, for example, in the form of solutions or suspensions prepared with water or suitable organic solvents such, for example, as alcohol, petroleum, tar distillates or the like. There may also be used aqueous solutions or aqueous emulsions of organic solvents containing the active substances, for coating, spraying or impregnating the objects to be protected.

The spraying and dusting preparations may contain the usual inert fillers or identifying agents such, for example, as kaolin, gypsum or bentonite or other additions such as sulfite cellulose waste liquor, cellulose derivatives and the like. Furthermore, in order to improve the wetting or adhesive property the usual wetting agents or adhering agents may be added. The pest-combating preparations may be made in powdered form or in the form of aqueous dispersions or pastes or in the form of self-dispersing oils.

The compounds may be present in the pest-combating preparations as the sole active substance or in combination with other insecticides and/or fungicides. The use of such preparations for plant protection is carried out by the usual spraying, dusting or fumigating methods. Suitably substituted compounds possess a so-called systemic action on plants.

The following examples illustrate the invention, the parts being by weight unless otherwise stated, and the relationship of parts by weight to parts by volume being the same as that of the kilogram to the liter.

*Example 1*

19.0 parts of trichloracetic acid ethyl ester are mixed with 16.6 parts of triethyl phosphite and the mixture is allowed to stand. After a short time the reaction commences and the temperature is maintained at 60–70° C. by cooling. When the temperature no longer rises, the whole is heated for 2 hours at 70–80° C. The solution becomes bright red and is turbid, the reaction mixture is then heated at 120° C. under a vacuum produced by a water pump, and 6.5 parts of forerunnings distil off. The residue is then distilled under a high vacuum. At 103–105° C. under 0.1 mm. pressure the condensation product passes over in good yield in the form of a colorless oil.

In the same manner trichloracetic acid ethyl ester can be condensed with triisopropyl phosphite to form a yellowish oil or trichloracetic acid methyl ester can be condensed with triethyl phosphite to form an oil boiling at 90° C. under 0.1 mm. pressure.

*Example 2*

A preparation for dormant spray is prepared as follows: 5 parts of the condensation product from triethyl phosphite and trichloracetic acid ethyl ester, 10 parts of the condensation product of 1 mol of tertiary octylphenol with 8 mols of ethylene oxide, 80 parts of spindle oil and 5 parts of oleic acid are mixed together to give a clear oily liquid which can be emulsified by pouring it into water.

By thoroughly spraying fruit trees in the spring shortly before bud-burst with a spraying liquor containing one percent of the above concentrated preparation the overwintering eggs of aphids, winter moths (Cheimatobia), ermine moths (Hyponomeuta), apple sucker (*Psylla mali*), and red spiders (Tetranychides) are killed. The treatment may be combined with a treatment with a copper preparation.

By the application of the aforementioned dormant spray the following insects can be combated:

Anthonomus pomorum—Apple-blossom weevil
Aphidinae—Aphids
Argyresthia ephippella—Cherry-blossom moth
Quadraspidiotus ostreaeformis—European fruit scale
Quadraspidiotus perniciosus—San José scale
Eulecanium corni—European fruit lecanium
Eriophyes piri—Pear leaf blister mite
Eriosoma lanigerum—Woolly apple aphid
Hyponomenta malinella et padella—Ermine moth
Psylla mali—Apple sucker
Tmetocera ocellana—Bud moth
Argyroploce variegana—Bud moth

Example 3

2 parts of the condensation product from tri-ethyl phosphite and trichloracetic acid ethyl ester, 1 part of the condensation product of 1 mol dodecylmercaptan and 10 mols of ethylene oxide and 7 parts of diethylene glycol are mixed together.

The resulting preparation can be used, for example, for the destruction of aphids. By spraying fruit trees, asters, beans or sunflowers with a spraying liquor containing 0.1 percent of the active substance these plants can be freed from aphids.

For the preparation of spray concentrates other emulsifying agents also may be used. There come into consideration ion-free emulsifying agents, e.g. condensation-products from aliphatic alcohols or amines or carboxylic acids which contain a long chain hydrocarbon radical of about 10–30 carbon atoms with ethylene oxide, such as the condensation product from 1 mol of octadecyl-alcohol and 25–30 mols of ethyleneoxide, the condensation product from 1 mol of soya oil fatty acid and 30 mols of ethylene oxide or that from 1 mol of technical oleylamine and 15 mols of ethyleneoxide or that of 1 mol of dodecylmercaptan and 12 mols of ethylene oxide. Among the anion active emulsifying agents which may be used there are named the sodium salt of lauryl sulfonic acid, the sodium salt of dodecyl benzene sulfonic acid, the sodium or triethanol amine salt of oleic acid or of abietic acid or of mixtures of these acids or the sodium salt of petroleum sulfonic acid. Furthermore, cation active emulsifying agents may be used, like dodecylpyridinium chloride.

Instead of diethylene glycol other organic solvents may be used for preparing the spray concentrate e.g. ethyl alcohol, methanol, isopropanol, acetone, methyl ethyl ketone, methyl cyclohexanol, benzene, toluene, kerosene, white spirit come into consideration.

Example 4

The preparation described in Example 3 is also active against Colorado beetles. When potato plants are sprayed with a spraying liquor of 0.2 percent strength (=0.04 percent of active substance) and the larvae of Colorado beetles are placed on the plants after 24 hours, the larvae are paralyzed after a further 24 hours and die after 48 hours.

Example 5

50 parts of the condensation product from triethylphosphite and trichloracetic acid methyl ester, and 50 parts of the sodium salt of a petroleum sulfonic acid are mixed. There is obtained a spray concentrate which may be used for treatments during the summer season. By spraying fruit trees or other plants with a spraying liquor containing 0.02 percent of the active substance the following insects can be combated:

Aspidiotus hederae—Oleander scale
Quadraspidiotus ostreaeformis—European fruit scale
Quadraspidiotus perniciosus—San José scale
Lepidosaphes ulmi—Oystershell scale
Carpocapsa pomonella—Codling moth
Clysia ambiguella—Wine moths
Polychrosis botrana—Wine moths
Eriosoma lanigerum—Woolly apple aphid
Heliothrips haemorrhoidalis—Greenhouse thrips
Hopoclampa flava et minuta—Plum sanfly
Hyponomenta malinella et padella—Ermine moth
Pericerya purchasi—Cottony-cushion scale
Phyllotreta atra—Flea beatle
Pseudococcus citri—Citrus mealybug
Psylla pyricola—Pear psylla
Rhagoletis cerasi—Cherry fruit fly
Trialeurodes vaporariorum—Greenhouse whitefly
Tmetocera ocellana—Bud moth
Argyroploce variegana—Bud moth
Tetranychidae—Spider mites A spray concentrate can also be prepared by mixing 20 parts of the condensation product named in the first paragraph, 10 parts of the condensation product of 1 mol of tertiary octylphenol and 8 mols of ethyleneoxide and 70 parts of isopropanol.

Instead of the condensation product named in the first paragraph that obtained from triethylphosphite and trichloracetic acid ethyl ester may be used.

Example 6

1 part of the condensation product from triethylphosphite and trichloracetic acid ethyl ester, is mixed with 99 parts of talcum. There is obtained a dusting powder which is very active against the house fly musca domestica. The content of active ingredient may be increased to 10 percent or more or decreased to 0.1 percent or less.

Instead of talcum other carriers in powder form, e.g. bentonite, koalin or mixtures thereof can be used.

Example 7

2 parts of the condensation product from triethylphosphite and trichloracetic acid ethyl ester, 80 parts of sulfur and 18 parts of copper oxychloride are mixed. This is a dusting powder which acts as insecticide and fungicide.

What is claimed is:

1. A method for combating insects which comprises treating the objects which are to be protected against the insects with an effective amount of a compound of the general formula

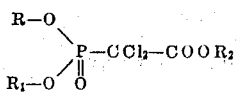

wherein R and $R_1$ each is an alkyl radical containing 1 to 4 carbon atoms and $R_2$ is an alkyl radical containing at the most 6 carbon atoms and only carbon and hydrogen atoms.

2. A method for combating insects which comprises treating the objects which are to be protected against the insects with an effective amount of the compound of the formula

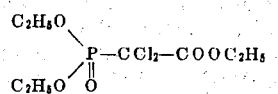

3. A method for combating insects which comprises treating the objects which are to be protected against the insects with an effective amount of the compound of the formula

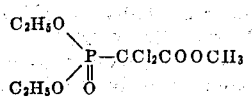

4. A method for combating insects which comprises treating the objects which are to be protected against the insects with an effective amount of the composition which consists of 20 parts by weight of the compound of the formula

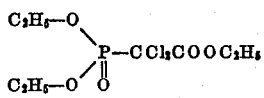

10 parts by weight of the condensation product of 1 mol of dodecylmercaptan and 10 mols of ethylene oxide, and 7 parts by weight of diethylene glycol.

5. A method for combating insects which comprises treating the objects which are to be protected against the insects with an effective amount of a dusting powder which consists of 0.1 to 10 percent by weight of the compound of the formula

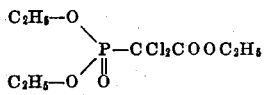

and 99.9 to 90 percent by weight of a powdered inert carrier.

6. An insecticidal composition of matter which consists of a trialkylphosphite-trichloracetic acid alkyl ester compound of the general formula

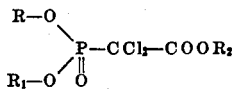

wherein R and R₁ each is an alkyl radical containing from 1 to 4 carbon atoms and R₂ is an alkyl radical containing at the most 6 carbon atoms and only carbon and hydrogen atoms, an organic solvent for said condensation product, and a non-ionogenic emulsifying agent.

7. An insecticidal composition of matter which consists of 20 parts by weight of the compound of the formula

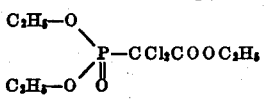

10 parts by weight of the condensation product of 1 mol of dodecylmercaptan and 10 mols of ethylene oxide, and 7 parts by weight of diethylene glycol.

8. A pesticidal composition comprising as the active ingredient a diethoxy-phosphoryl-dichloracetic acid ester corresponding to the formula

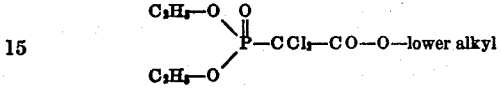

and a surface active agent and solid pulverulent pesticide carrier.

9. A pesticidal composition comprising as the active ingredient a dimethoxy-phosphoryl - dichloracetic acid ester corresponding to the formula

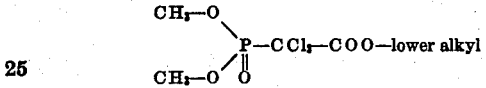

and a solid pulverulent pesticide carrier.

References Cited in the file of this patent
UNITED STATES PATENTS

| | | |
|---|---|---|
| 2,535,173 | Tawney | Dec. 26, 1950 |
| 2,599,761 | Harman | June 10, 1952 |